Figure 1

INVENTORS:
Donald B. Broughton
Clarence G. Gerhold
BY: Chester J. Giuliani
Donald E. Moehling
ATTORNEYS.

United States Patent Office 2,985,589
Patented May 23, 1961

2,985,589

CONTINUOUS SORPTION PROCESS EMPLOYING FIXED BED OF SORBENT AND MOVING INLETS AND OUTLETS

Donald B. Broughton, Chicago, and Clarence G. Gerhold, Palatine, Ill., assignors, by mesne assignments, to Universal Oil Products Company, Des Plaines, Ill., a corporation of Delaware Filed May 22, 1957, Ser. No. 660,790

16 Claims. (Cl. 210—34)

This invention relates to a process for fractionating the components present within a mixture of compounds by contacting said mixture with an elongated bed or a plurality of fixed beds of solid sorbent having a selective sorbency for at least one or more components of said mixture and substantially lesser sorbency for at least one other component of the feed mixture. More specifically, the invention concerns a method for separating the components of a mixture of compounds having different degrees of sorbency on a solid sorbent which comprises contacting the feed stock mixture under conditions of simulated countercurrent flow with a fixed bed of said solid sorbent having a relatively great depth, compared to its width, withdrawing non-sorbed raffinate from a downstream outlet, introducing at an inlet further downstream a displacing agent for the sorbed component, withdrawing the latter sorbate from succeeding, relatively downstream stages in the process flow, the points of introduction of the feed stock and desorbent into the process flow and the points of withdrawing effluent streams constantly shifting in equal increments downstream to provide a continuous, simulated countercurrent flow of the several inlet and outlet streams in relation to the bed of solid sorbent.

In one of its embodiments, this invention relates to a continuous process for separating the components of a mixture of compounds, at least one of which is selectively sorbed by contact with a solid sorbent and at least one other component is relatively less sorbed by the sorbent which is capable of having its sorbency restored by displacing selectively sorbed component therefrom, said process comprising introducing feed stock containing said mixture of compounds into one zone of a fixed bed of said solid sorbent, introducing a desorbent capable of displacing the selectively sorbed component from said sorbent into another zone of the fixed bed of sorbent which is downstream in relation to the zone into which said feed stock is charged, substantially simultaneously withdrawing relatively less sorbed component from an intermediate zone of said fixed bed between the zone into which said feed stock is charged and the zone into which said desorbent is charged, substantially simultaneously withdrawing a mixture of selectively sorbed component and desorbent from a zone which is downstream with respect to the zone into which said desorbent is charged, maintaining a circulating stream of fluid flowing through said series of interconnected zones of fixed sorbent and periodically advancing downstream the point of charging said feed stock, while simultaneously and equally advancing the point of charging desorbent and withdrawing sorbed and relatively less sorbed components.

Other embodiments of the invention relating to specific charging stocks, specific sorbents, particularly arrangements of sorbent-containing zones and particular flow arrangements will be further referred to in the following description of the invention.

It is now widely recognized that various solid sorbents of specific composition and structure may be contacted with a mixture of compounds, the components of which differ in their relative sorbency on the solid, to thereby provide a means for segregating the individual components according to their structure. This type of separation procedure has been applied to mixtures of inorganic as well as organic compounds and has found one of its most frequent applications in the field of separating hydrocarbon mixtures containing components which differ as to their structural classes, being particularly applicable to the separation of mixtures which are relatively difficult to separate by other means of separation. One type of solid sorbent, generally characterized as having "adsorptive" properties, selectively adsorbs that component of a mixture of organic compounds which has the highest relative degree of polarity, the adsorptive capacity and retentivity of the adsorbent for the sorbate component of the feed stock depending upon the availability of a large superficial area on or in the adsorbent particles, the presence of a polar radical or an unsaturated bond within the structure of the component selectively adsorbed (sorbate), and the lack of such polar groups or points of unsaturation within the structure of the feed stock component less sorbed by the solid adsorbent. Adsorbents of this type are typified, for example, by such solids as silica gel (dehydrated), activated charcoal, the aluminum silicates (such as the various clays and activated silica gels, including such typical examples as Attapulgus clay, montmorillonite, dehydrated, synthetically prepared composites of alumina and silica activated by heating to a temperature in the region of, but somewhat below the approximate fusion point of the composite), activated alumina, particularly gamma alumina, as well as other materials of similar character which adsorb such polar or unsaturated compounds by virtue of electro-static attraction for the component of the feed stock mixture containing the polar or unsaturated groups and which retain a layer of sorbate component of mono-molecular thickness on the surface of the sorbent. Typical of the feed stocks which may be separated by contact with a solid, activated adsorbent include, for example, paraffinic hydrocarbon fractions (such as a gasoline fraction) containing mercaptans and/or amines, the latter polar compounds being selectively retained on the adsorbent particles, mixtures of paraffins and olefins wherein the olefinic component is the component selectively adsorbed by the solid adsorbent, mixtures of aromatic and non-aromatic hydrocarbons wherein the aromatic constituent is selectively adsorbed by the solid adsorbent, mixtures of water vapor and an inert gas, such as nitrogen or air containing moisture (the moisture being selectively adsorbed), mixtures of phenols and/or sulfur compounds such as thiophene with liquid hydrocarbons, the phenolic or sulfur compound being selectively adsorbed, and in numerous other applications, well known in the chemical arts.

Another type of solid adsorbent which separates mixtures of organic compounds by virtue of a difference in the structure of the components of the feed stock is the so-called "clathration" method wherein solid particles of urea, thiourea, and certain other amides are contacted with a mixture of organic compounds to be separated, the components which have a relatively straight chain configuration selectively forming a solid adduct or "clathrate" with the sorbent to the exclusion of the non-clathrate-forming branched chain components when urea is utilized as the solid separating agent or when thiourea is utilized as the sorbent, the clathrate or adduct forms with the branched chain component, to the selective exclusion of the straight chain individuals present in the feed stock mixture. Thus, a mixture of organic compounds, the components of which differ in structure by virtue of the presence of straight chain, branched chain or cyclic components in the same mixture may be contacted in liquid phase with solid particles of urea; it will be found that the straight chain components of the mixture are selectively retained by the urea particles in the form of an insoluble clathrate, while the branched chain components of the mixture can be separately withdrawn from the resulting crystalline clathrate. On the other hand, the same mixture of organic compounds can be contacted with thiourea and it will be found that the branched chain components of the mixture will form a clathrate with the thiourea, while the straight chain components which fail to clathrate with thiourea may be separately withdrawn for recovery. The method of separation utilizing urea or thiourea within the resulting selectivity differences, may be utilized for separating mixtures of organic compounds generally, the method being particularly useful for separating mixtures of branched chain and/or cyclic hydrocarbons from straight chain hydrocarbons.

Still another type of separation employing a solid sorbent is the "sorption" process, utilizing solid particles of a porous sorbent which selectively occludes into the porous structure of the sorbent the straight chain components of the feed stock containing at least four carbon atoms per molecule, but which does not permit entry into the pores of the sorbent of the branched chain components in the feed stock. The pores present in these sorbents are from 4 to 5 Angstroms in cross-sectional diameter and the sorbent belongs to a type of material characterized as a dehydrated metal aluminosilicate, the metallo constituent of which is selected from the alkali and alkaline earth metals. Thus, a compound having a branched chain or cyclic structure, such as 2,3-dimethylbutane or cyclohexane may be readily separated as a non-sorbed raffinate from a compound having a straight chain structure, such as n-hexane (the initial mixture ordinarily being quite difficult to separate by fractional distillation) by contacting the mixture of these hexanes with solid particles of a dehydrated metal aluminosilicate sorbent; it will be found that the non-sorbed effluent or "raffinate" will be enriched with respect to the branched chain and cyclic constituents (if present in the feed stock mixture) when the amount of sorbent contacted with the feed stock is sufficient to occlude all or substantially all of the normal or straight chain components in the mixture. These solid sorbents, also referred to as "molecular sieves," may be prepared by coprecipitating or otherwise combining alumina, silica, and the involved metal oxide, such as an oxide or hydroxide derivative of an alkali metal such as sodium, lithium or potassium or of an alkaline earth metal, such as calcium, magnesium, barium, or strontium to form a uniform and intimately dispersed mixture of silica, alumina and the metal oxide or hydroxide, removing excess water from the mixed oxides and thereafter heating the recovered dispersed mixture to a temperature at which the water of hydration will be removed by evaporation from the particles. If desired, and in some cases, it will be preferred, to calcine the resulting dehydrated mixed oxides at a temperature of from about 200° to about 400° C. to develop structural rigidity and particle strength.

Another type of separation process to which the present process flow is applicable, is the type involving a chemical reaction with a solid sorbent (reactant) maintained in place as a fixed bed, with the sorbable component (the other reactant) being supplied in a fluid stream containing the same. Typical of such a separation is the removal of alkaline earth metals from so-called "hard" water to thereby soften the latter and/or de-ionize the same in the de-ionization process of separating aldehydes, ketones and carboxylic acids from a non-aqueous glycol mixture. Thus, a stream of hard water may be charged into a so-called "softening" tank packed with a fixed bed of zeolite particles or with a sulfonated resin reactive with alkaline earth metals, the bed of softening agent selectively removing the hardness-causing alkaline earth metal ions and producing an effluent of softened, ion-free water. The introduction of a regenerating solution, such as an aqueous sodium chloride solution (for zeolite-type and sulfonated resin type water softeners) is the equivalent of the desorbent stream, hereinafter more fully characterized and which acts as a displacing agent in the bed of softening agent. In other typical de-ionizing processes, an aqueous ion-containing stream, such as aqueous sugar solution containing chloride or sulfate, ions in solution, a de-ionizing resin such as an insoluble resin containing amide or amino groups may be utilized as sorbent in the de-ionizer tank.

The present method of operation is applicable to all of the aforementioned types of separation utilizing a solid sorbent capable of having its sorbency restored in a subsequent treatment of the "spent" sorbent, whether of the surface adsorption type of separation, clathration or molecular sieve type of separation. The method, however, is particularly applicable to separations utilizing sorbents which are relatively unstable structurally and which therefore do not permit removal of the solid sorbent from one zone to the other without suffering a loss of its activity and usefulness because of attrition and other consequences of its structural instability. For purposes of this description and for expressing the generic concepts of this invention, the various methods of separation, each of which involve the use of solids which selectively combine in some form with at least one component of a mixture of multiple components to form a different, or "spent" solid, whether clathration, adsorption, occlusion or by chemical reaction, will be referred to herein as "sorption," and the use of the latter term herein is intended to include each and every type of separation indicated above.

Figure 1:
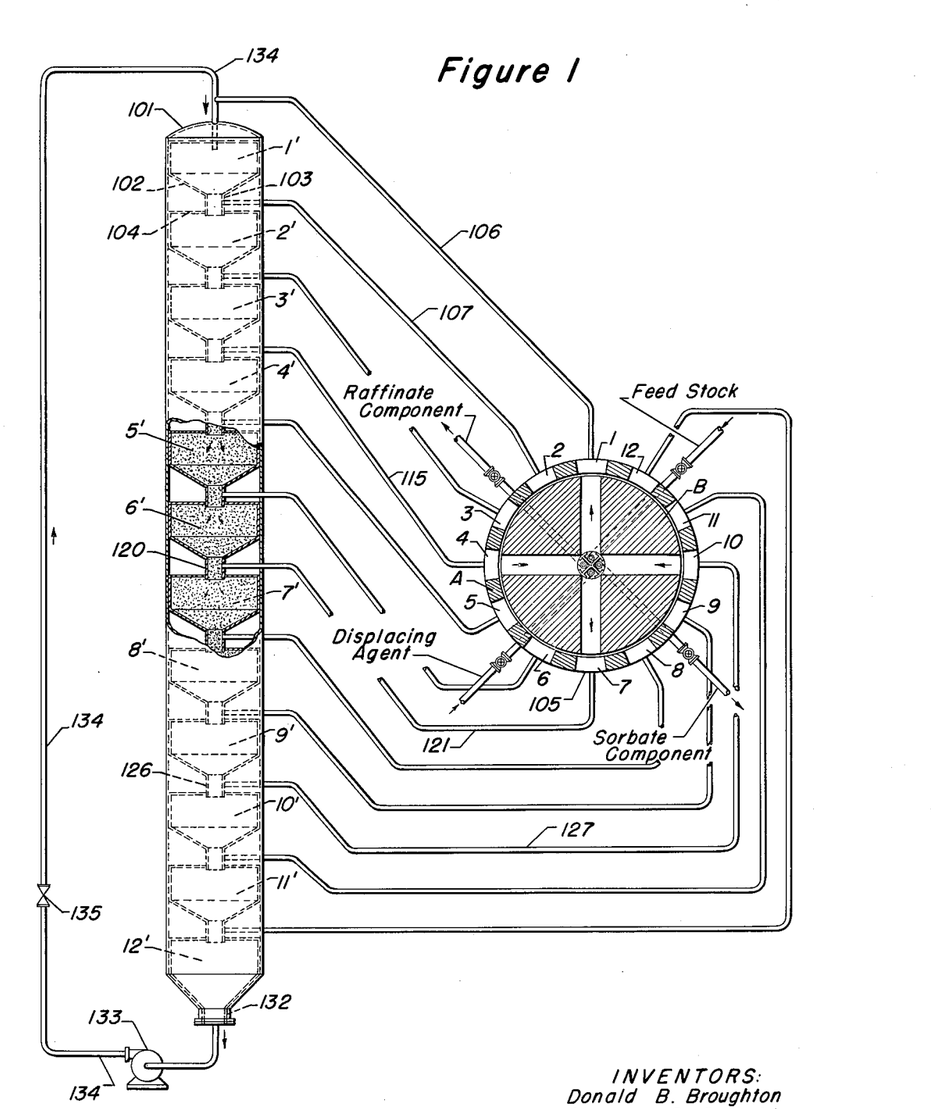
Figure 1 is a view of a simplified form of the column and control valve for carrying out the process of this invention.

The present process is also herein characterized as a "cyclic" and "continuous" process. It is thereby intended to define a method in which the various inlet and outlet streams are charged and withdrawn, respectively, in a continuous manner, without interruption, with respect to either the flow rate or composition of the several streams, the bed of solid sorbent remaining in substantially fixed position within the sorption column, the feed and desorbent inlets and the product withdrawal outlets changing their position into and from the column in equal shifts. Although the solid sorbent remains in fixed position, a simulated countercurrent flow arrangement is thereby established, since incoming feed is contacted at its point of introduction with sorbent relatively spent in comparison with downstream contacting zones; that is, the raffinate stream or least sorbed component of the feed stock is withdrawn from a bed in a series of sorbent "beds" constituting the sorption zone at the opposite end of the series from the feed stock inlet. The present process may also be visualized as being effected in a series of four, interconnected zones of a single fixed bed of solid sorbent having no actual line of demarcation between each of the zones other than the zone boundaries defined by the points of inlet and withdrawal for the various fluid streams. The first and fartherest upstream zone is referred to as a "sorption" zone, the next downstream zone is referred to as a "primary rectification" zone; the next adjacent downstream zone is referred to as a "desorption" zone; and the fartherest downstream zone is herein designated as a "secondary rectification" zone. The terms "upstream" and "downstream" are to be interpreted herein in their ordinary and usual definition in the chemical process arts; that is, the term "downstream" refers to an advanced point in the direction of flow relative to the point of reference, whereas "upstream" refers to a retrospective point in the direction of fluid flow. Although for the sake of simplicity herein, the zones of contact between fluid and sorbent are described as being defined by a series of interconnected fixed beds; it is to be emphasized that the sorbent herein specified may be considered as a single, continuous bed, each of the zones being defined by the points of inlet and points of withdrawal of the various streams flowing into or out of the bed. The contacting column, when in the form of a continuous bed, is relatively elongated compared to its width and is more preferably a long, slender bed. In a still more preferred type of contact zone, the bed is divided into a series of compartments or "beds" with a substantially reduced constriction between each compartment, the constriction, however, also containing sorbent. The latter particularly preferred arrangement is shown in the accompanying diagrams, hereinafter more fully described. The advantages of constricting the width of the bed at the entry and withdrawal points of the various streams are: (1) prevention of convective back-mixing of fluid in a direction opposite to the direction of fluid flow and (2) greater ease of distributing fluids flowing into and out of the contacting column because of the ability to thereby eliminate channeling and other undesirable loss of uniform distribution. By dividing a vertical contacting bed into smaller zones defined by a partition, as illustrated in Figure 1 of the accompanying diagram, the load of solid sorbent is distributed over a plurality of intermediate supports, thereby eliminating an accumulation of the entire weight of the sorbent on the bottom, single support of the contacting bed.

Suitable charging stocks which may be utilized in the process of this invention are characterized as containing a mixture of two or more compounds, one of which is sorbed with relatively greater tenacity on a solid sorbent than one or more other components present in the mixture comprising the feed stock. In view of the applicability of the present process to various types of adsorptions, including surface adsorption, clathrate formation, and molecular occlusion, as described above, any mixture of organic compounds containing at least one component subject to the various physical phenomena responsible for selective retention by a solid sorbent may be employed herein as feed stock.

Other typical examples of the application of the sorption type of contacting procedure, include, for example, the separation of normal alcohols such as normal butanol, from branched chain or cyclic alcohols such as tert-butyl alcohol or cyclohexanol; the separation of normal or straight chain aliphatic hydrocarbons, such as n-butane, n-pentane, n-hexane, n-hexene, n-heptene, etc. from branched chain paraffins and olefins, such as isobutane, 2,3-dimethylbutane, etc. or cyclic hydrocarbons such as cyclohexane, methylcyclopentane, etc.; separating straight chain aldehydes containing at least 4 carbon atoms per molecule from branched chain and cyclic aldehydes; separating straight chain ketones, such as methylethyl ketone, from branched chain ketones, such as di-isopropyl ketone, or from cyclic ketones such as cyclohexanone; separating straight chain aliphatic acids from branched chain or cyclic acids, such as the separation of oleic acid from its branched chain isomers; and the resolution of mixtures of many other classes of organic compounds which differ in structure within the class. The choice of molecular sieve sorbent for use in the process will depend upon the molecular size (i.e., the cross-sectional diameter) of the component to be sorbed.

The process of treating a mixed feed stock of inorganic or organic composition and the process flow which provides the continuous method of treatment provided by the present invention is further illustrated in the accompanying diagram which is described by reference to a particular feed stock comprising a mixture of a normal paraffin, such as n-hexane, and an isoparaffin, or cycloparaffin, such as a dimethylbutane or cyclohexane, respectively, utilizing a solid sorbent of the molecular sieve type (i.e., a dehydrated calcium aluminum silicate having pores of 5 Angstrom units internal cross-sectional diameter), the resulting separation process constituting one of the preferred applications of the present method of operation. It will be understood that in thus limiting the description to a particular feed stock for purposes of simplifying such description, it is not thereby intended to limit the scope of the invention necessarily to the indicated feed stock, sorbent and process conditions or flow. The process to which the accompanying diagram is directed is also described by reference to a particular arrangement of multiple beds or zones of fixed or stationery solid sorbent and to a process operated under essentially liquid phase conditions, but it will be understood that other arrangements of sorbent beds, vapor or gaseous phase operation and the use of other types of equipment are also contemplated within the broad scope of the present invention.

Although the solid sorbent will be described as being distributed in a "plurality of fixed beds," it is obvious that the series of interconnecting zones actually constitute a continuous, vertical bed having conduits of reduced cross-sectional area, which also contain sorbent, between the adjacent, so-called "beds." A fluid pump is provided between at least one pair of adjacent beds to provide a positive, unidirectional (downstream) flow of fluid. One of the essential characteristics of the process is that a continuously flowing stream of fluid (either liquid or vapor phase) is circulated through the series of beds from the first to the last in the series, at least two inlet streams being added to the continuously flowing fluid stream and at least two outlet fluid streams being withdrawn from the continuously circulating fluid, outlet points alternating with the points of inlet. The feed stock enters one end (inlet) of one of the fixed beds of sorbent, the non-sorbed portion of the fluid feed stock or effluent stream (i.e., the residue of feed stock remaining after sorption of at least a portion of the selectively sorbed material in the first bed of the sorption section of the process) leaving the opposite end of the first bed in the sorption section and thereafter enters the inlet of the next adjacent downstream sorption zone, which similarly contains a fixed bed of solid particles of sorbent. A sufficient number of such fixed beds in series (although not necessarily exceeding one in number), in contiguous, interconnecting relationship are provided to substantially completely remove the selectively sorbed component (sorbate) from the feed stock and to provide a substantially pure stream of non-sorbed or "raffinate" component of the feed stock issuing from the outlet of the last bed in the series of beds which define the sorption section of the process flow. In the case of some feed stocks and some sorbents, only one bed is required to effect such separation, while in other cases, a series of two or more, generally not more than about ten beds in series, are required, the number required or the length of the series in aggregate depending upon the sorptiveness of the sorbable component of the feed stock, the depth of sorbent, the pressure, and numerous other factors involved in the process. The outlet from the last fixed bed of the series of compartments in the sorption section contains an outlet port through which a portion of the non-sorbed raffinate component in admixture with the continuously circulating fluid stream is withdrawn. The remaining portion of the effluent raffinate stream from the sorption section continues to flow through one or more succeeding series of interconnecting fixed beds which constitute, in the aggregate, the "primary rectifying stage" of the process and is joined at the outlet from the last bed in the primary rectifying section by an inlet stream of a so-called displacing agent or desorbent flowing in the same direction as the mixture of carrier fluid and continuing stream of raffinate material. The desorbent is a material which is capable of displacing from the solid sorbent the component of the feed stock already sorbed on the solid sorbent by virtue of a previous cycle of operation, the stream flowing through the immediately succeeding beds thus comprising a mixture of desorbent and sorbate previously sorbed from the feed stock in a prior cycle of operation and released from the solid sorbent by contact thereof with the desorbent. Its displacing action is primarily a mass action effect, being charged in sufficient quantity to provide a molar ratio of desorbent to sorbate at any given point at least greater than 1 to 1, and is charged in an amount preferably sufficient to provide a molar ratio of at least 10 to 1, up to about 30 to 1. The raffinate remaining in the effluent stream leaving the sorption section of the process, being non-sorbed, tends to occupy the void spaces between particles of sorbent and thus tends to become "lost" in the first one or more beds of the primary rectifying section. As the mixed stream of remaining desorbent and sorbate flows through the desorption stage of the process, it becomes progressively enriched with sorbate, the displacing agent or desorbent releasing additional sorbate in its continuing flow, taking the place of the displaced sorbate in the pores which make up the structure of the sorbent. At some more distant point in the downstream direction of flow (that is, at the end of the primary rectifying section of the process flow), a stream comprising a portion of the sorbate, desorbent and circulating fluid (if different from desorbent) is withdrawn from the process flow and discharged from the present cycle of operation as ultimate product or as intermediate feed stock for further purification, if desired. This stream may be fractionated (for example, in an auxiliary distillation unit) to separate the desorbent from a relatively pure sorbate product. The remaining portion of desorbent and sorbate not removed through the sorbate outlet continues its flow upstream through one or more succeeding fixed beds of sorbent, referred to as a "secondary rectification" zone of the process flow wherein the raffinate or lesser-sorbed component is washed off from the sorbent and out of the voids between the particles of sorbent by the desorbent-sorbate mixture. The residual desorbent-circulating fluid mixture comprising the effluent from the last succeeding bed in the secondary rectification section is once again joined by the incoming feed stock at the inlet for the latter stream, thereby completing one cycle of operation.

During the course of the above continuous process of sorption and desorption, the point of introduction of feed stock and desorbent in the cycle and the points of removing non-sorbed or raffinate component of the feed stock as well as the selectively sorbed or sorbate component are either periodically or continuously shifted to a downstream sorbent bed, each of the indicated points of entry and points of withdrawal being shifted an equal aliquot portion of the total number of beds in a downstream direction with respect to the position of these points at an increment of time prior to the shift. Thus, the point of introducing feed stock into the process flow ultimately arrives at the point in the cycle of operation where sorbate component was removed in a preceding stage of the process, one circuit in the cycle of operation then having been completed.

The invention is more specifically described with reference to the accompanying drawings in which.

Referring to the accompanying diagram, a suitable arrangement of apparatus in simplified form is illustrated for carrying out the process of this invention. Any suitable apparatus comprising a series of fixed beds or one single continuous bed of sorbent, if desired, having fluid-flow connecting means between the outlet of one bed and the inlet of its next adjacent bed and comprising a suitable means, such as a valve or manifold, for shifting the points of inlet and outlet for the various feed and product streams involved in the process may be provided. The accompanying diagram illustrates one of the preferred apparatus designs, being particularly suitable because of its compact arrangement of the series of fixed beds in adjacent, superadjacent and subadjacent relationship to each other. The series of fixed beds may be a number (at least 4) of horizontally spaced, separate beds interconnected by a pipe between the bottom of one bed to the top of its upstream adjacent bed, or the beds may be stacked one upon another, within a suitable vertical column, as illustrated in Figure 1 of the accompanying diagram, herein referred to in its entirety as contacting column 101 containing suitably shaped partitioning means which divide the vertical column into a series of adjacent contacting zones, such as zones 1' to 12', each zone being divided from its adjacent contacting zones (except the uppermost and lowermost zones) by a funnel-shaped partitioning member such as partition 102 in contacting zone 1', having a downcomer 103 of restricted cross-sectional area opening into a subadjacent contacting zone 2' through a transverse partitioning member 104 which comprises the upper boundary of said subadjacent contacting zone 2'.

An essential portion of the present apparatus, essential, that is, to the realization of the type of flow provided by the present method of operation is the provision of a suitable programming device for changing the points of inlet and outlet into and from the contacting column and for advancing each of these in equal increments and in a downstream direction during the operation of the process. Any suitable form of fluid distribution center, such as a manifold arrangement of valves and incoming and outgoing lines may be provided with timed, electrically operated switches to open and close the appropriate valves. The programming principle may also be suitably effected by means of a plug valve of particular design, illustrated in the accompanying diagrams, particularly Figure 2 thereof which depicts a circular valve 105 having a valve housing A and a continuously revolving plug B rotatable in said housing A in fluid sealed relationship with said housing A. The latter housing contains a number of inlet and outlet ports 1 to 12 connecting in fluid flow relationship with internal passageways inside the valve plug through which certain inlet and outlet fluid streams, hereinafter described, enter and are withdrawn from fixed beds in contacting column 101. The valve plug is arranged to provide at least 4 passageways to accommodate at least two separate inlet streams and at least two separate outlet streams, the two inlet passageways alternating with the two outlet passageways. Although it is generally preferred to arrange the inlet and outlet passageways in the valve plug approximately 90° apart, thereby positioning the outlets and inlets on opposite sides of the plug, it is feasible to provide any suitable arrangement of ports and passageways and thereby increase or decrease the angular relationship between the respective inlet, and outlet passageways, depending upon the relative number of fixed beds of sorbent to be assigned to the different stages of the operation.

Valve 105, representing a suitable programming device for the purpose aforesaid contains a number of fluid inlet and outlet ports, 1 to 12, corresponding to the number of contacting zones or fixed beds in column 101. The ports are positioned within housing A at finite and predetermined distances apart to direct inlet and outlet streams into and from column 101 to correspond to the desired program, prearranged for the process. The ports connect the passageways through the valve plug B to lines leading to the various fixed beds within the column 101 and thus provide a means for directing the inlet and outlet streams into and from the appropriate lines connected to the contacting zones, all in accordance with the prearranged program for the process. Thus, port 1 in valve housing A provides an opening through which a fluid stream going into or from valve plug B through line 106 connects port 1 in the valve housing with the top of contacting zone 1'. Similarly, port 2 in the valve housing connects the port in the valve with line 107 which connects with downcomer 103 between contacting zones 1' and 2' of column 101. Since, however, no internal passageway in plug B opens into zone 2' (i.e., in the position of the plug illustrated in Figures 1 and 2), but instead, the solid portion of plug B blocks port 2 in fluid-sealed relationship thereto, no fluid flows through port 2 into line 107. In the same manner, ports 3 to 12 in the valve housing connect with their corresponding contacting zones 3' to 12' through a connecting conduit, as hereinafter more fully described.

For the purpose of simplifying the description of the process and apparatus involved in the present invention, the method of operating the present process and the means by which the components of the mixed feed stock are separated will be described by reference to a particular feed stock comprising a mixture of normal and isoparaffins such as a mixture of normal and isohexanes, a mixture particularly difficult to separate by simple fractional distillation. It is to be emphasized, however, that in thus specifying a particular mixture of hydrocarbons as the feed stock in order to simplify the description, the applicability of the present invention is not intended to be limited to such a specific feed stock, the method being applicable with as great or greater felicity to any mixture of organic or inorganic components within the broad scope hereinbefore indicated. For such a separation as the indicated resolution of mixed normal and branched chain hexane isomers, the solid sorbent in each of the sorption zones 1' to 12' in column 101 is a "molecular sieve" of the type comprising discrete, generally granular or of fixed geometric shape particles of a metallo-aluminum silicate, heretofore more fully characterized, the solid sorbent being packed in the sorption beds by random distribution therein. With such distribution, there will be void spaces or interstices distributed throughout the bed, between the particles comprising each of the beds.

Figure 2:
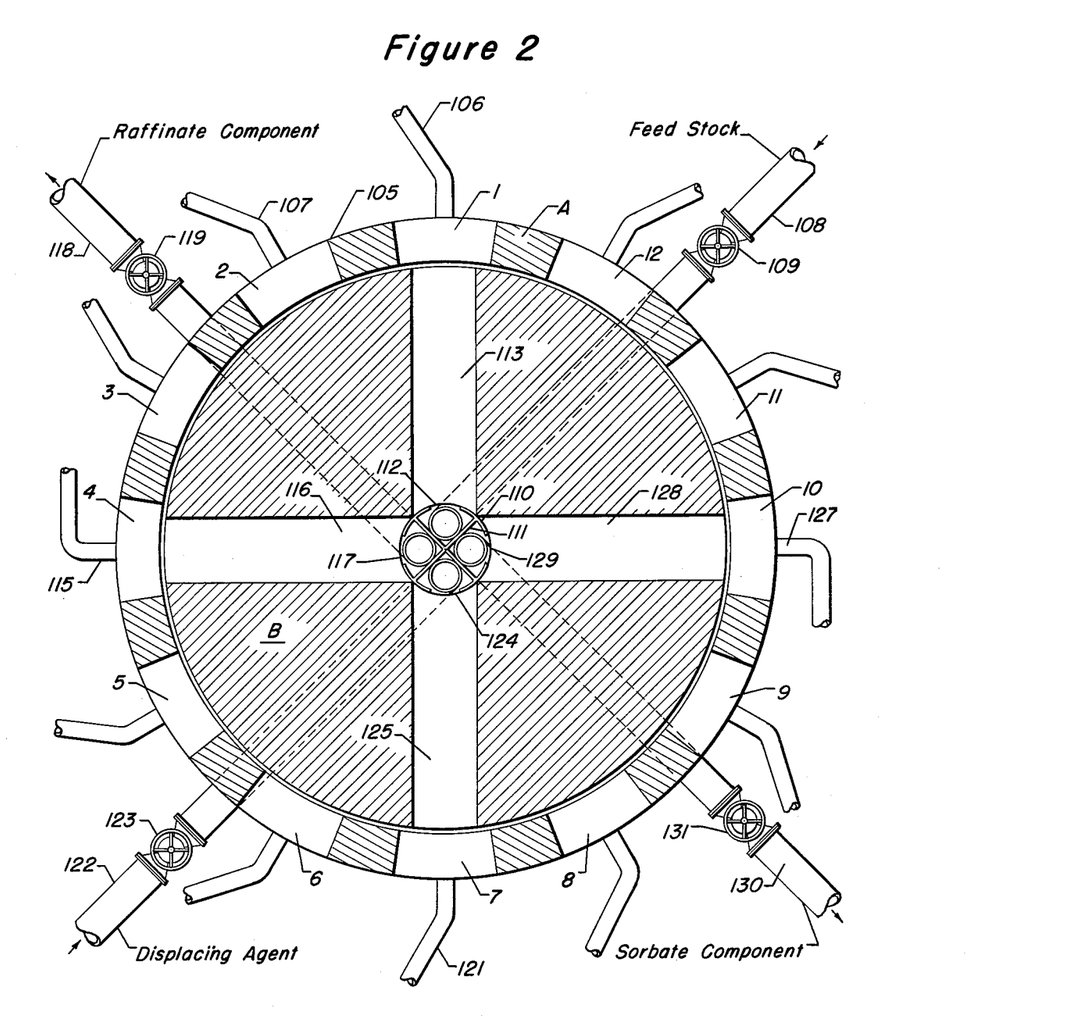
Figure 2 is an enlarged view in section of the control valve of Figure 1.

In starting the process, a feed stock such as the indicated mixture of normal and isohexanes, desirably separated into a relatively pure stream of the normal component and a relatively pure stream of the iso components, is charged into the process flow through line 108 in amounts controlled by valve 109, the feed stock flowing through line 108 into a central axle 110 of the plug which is divided into four compartments by a divider member 111, line 108 discharging the feed stock mixture through orifice 112 in the hollow axle, into internal passageway 113 connecting with outlet port 1 in housing A. The stream flowing through port 1 enters line 106, which in turn, connects with line 134 conveying circulating carrier fluid from the bottom of the contacting column (zone 12') to the upper end of contacting zone 1'. It is, of course, axiomatic that the pressure of the feed stock must exceed the pressure of the carrier fluid in line 134, in order to force the fluid stream to flow into contacting zone 1' in a downstream direction of flow, that is, toward contacting zone 2'. The feed stock entering zone 1' contacts the aforementioned molecular sieve sorbent which selectively occludes the normal paraffinic component of the feed stock into its porous structure and selectively excludes the isoparaffinic components thereof, the normal or straight chain component (n-hexane in the present example) being retained in the solid sorbent while the branched chain component (the isohexane of this example) being permitted to pass through the bed of sorbent. The latter branched chain compound is the principal component, together with carrier fluid, hereinafter defined, of the stream withdrawn from zone 1' through downcomer 103. Any remaining n-hexane component in the stream leaving zone 1', particularly as the sorbent in zone 1' becomes spent with sorbed component, continues to flow through zone 1' into subadjacent contacting zone 2', the latter bed of solid sorbent removing an additional quantum of residual normal paraffins remaining in the effluent from the preceding or superadjacent contacting zone, if present. In general, a sufficient number of interconnecting fixed beds in series, each containing solid sorbent, or a continuous bed of sufficient length, are provided to supply sufficient sorbent capacity to remove all of the normal component of the feed stock and leave only iso or branched chain feed stock component remaining in the effluent stream. This may require only one bed or a number of beds in series, a shallow bed, or a bed of considerable depth, depending upon the efficacy of the sorbent and the sorbability of the feed stock components, as predetermined in preliminary tests.

In the present description wherein the particular feed stock specified is utilized in the process, the carrier fluid is conveniently an excess of desorbent charged into the process flow in the manner hereinafter indicated and is composed predominantly of a normal paraffin having a lower boiling point and lower molecular weight than the normal paraffin component of the feed stock. Specifically, when n-hexane is the feed stock straight chain component to be separated by sorption on the molecular sieve solid sorbent, the desorbent utilized is desirably a normal paraffin such as n-butane which displaces the n-hexane sorbate from the molecular sieve and is itself sorbed into the pores of the sorbent by virtue of its molar excess when initially contacted with "spent" sorbent, as compared to the amount of n-hexane sorbed on the molecular sieve particles. Since n-butane as the carrier fluid supplied by line 134 enters zone 7' with the feed stock, it occupies the pores of the sorbent which are not preferentially occupied by the n-hexane component present in the feed stock and thus, any excess sorbent in zone 1' and subsequent zones 2' . . . comprising the sorption section of the contacting column, sorbs the n-butane carrier fluid, leaving iso-hexane to occupy the voids between the particles of sorbent. However, as more feed stock mixture continues to flow into zone 1', prior to the complete shift in the point of feed stock inlet to zone 2', the incoming n-hexane displaces n-butane carrier fluid from the pores of the molecular sieve sorbent and more iso-hexane is present in the fluid stream (after removal of the n-hexane from the fluid stream by sorption on downstream beds of sorbent) which continues its flow through these beds of sorbent.

According to the design requirements, one of the downstream contacting zones, such as zone 3' in the diagram, is the last bed in the series of beds comprising the sorption section of the column, and the effluent stream leaving zone 3' is substantially pure iso-hexane in admixture with excess carrier fluid (n-butane, from which hexanes are readily separated by distillation). After the fluid stream has passed through contacting zone 3', through downcomer 114 (being prevented from flowing through any intermediate outlet conduits, such as line 107 because of blockage of outlet ports 2 and 3 by the solid portion of plug B in valve 105), at least a portion of the fluid stream flows into line 115 which is connected with port 4, the first outlet port available to the fluid stream in valve 105. This stream is a mixture of iso-hexane raffinate and n-butane carrier fluid or desorbent and may be thereafter fractionally distilled to recover the individual components of the stream, as desired. The stream of mixed iso-hexane and n-butane thus removed from the process through line 115 is conveyed into valve 105 through port 4 connecting with internal outlet passageway 116 in plug B of valve 105, and thereafter leaves the process flow by passing through orifice 117, in valve axle 110, into raffinate outlet conduit 118 in amounts controlled by valve 119. The amount of effluent thus removed from contacting column 101 through the raffinate outlet is carefully controlled by valve 119 to provide a residue of mixed carrier fluid and iso-hexanes which flows past outlet conduit 115 into subadjacent or downstream contacting bed 4'. The quantity of non-withdrawn portion of the fluid stream thus continuing to flow in its downstream course through column 101, as determined by the rate of withdrawing iso-hexane raffinate through valve 119, may be any desired fixed proportion of the total fluid stream withdrawn from zone 3' through downcomer 114, but is desirably at least 20% by volume of the latter stream and preferably at least 40%, up to about 80% by volume of the fluid stream in zone 3'. As this stream continues to flow through downstream beds of sorbent (that is, through bed 4' and succeeding beds), the desorbent or carrier fluid n-butane occupies the internal pores of the solid sorbent and the iso-hexane raffinate components of the residual fluid stream occupies the spaces or voids between the particles of solid sorbent.

It will be noted that the iso-hexane component of the fluid stream flowing successively through the series of beds of sorbent and which tends to occupy the spaces between the particles of sorbent, will also tend to be the last component to be swept from the succeeding beds of sorbent and thus will not generally be present in the downstream beds following the point of withdrawal of raffinate (iso-hexane-carrier fluid) stream from the process flow. Accordingly, in the stage of the process provided in the present illustration, the iso-hexane component present in the residual portion of the fluid stream which by-passes raffinate withdrawal line 115, will tend to be concentrated in bed 4', much less will be present in bed 5' and substantially none, if any, will be present in bed 6'. As the position of the inlet and outlet points change by rotation of plug B in valve 105, the downstream beds following the point of raffinate withdrawal will be constantly substantially free or iso-hexane; consequently, iso-hexane does not contaminate the stream of circulating fluid beyond the first to third or, at most, the fourth downstream bed beyond the bed from which raffinate is withdrawn. The series of beds between the point of raffinate withdrawal and the point of desorbent inlet, as hereinafter described, is a zone wherein the components of the fluid stream re-arrange themselves in the intervening beds of sorbent to effect the foregoing relative distribution of the iso-hexane component in the sorbent beds. This portion of the series of beds, that is, the beds immediately following the point of raffinate withdrawal, is referred to in the present process flow as the "primary rectification" section, because of such re-distribution of fluid components in the residual raffinate stream.

At some further downstream point in the series of sorbent beds; that is, at the outlet downcomer of one of the beds in the series 4', 5', . . . , as for example, at downcomer 120, which is the fluid outlet from bed 6', a stream of displacing agent (herein referred as desorbent) is charged into contacting column 101, thereby joining the fluid stream leaving fixed bed 6', the stream of desorbent entering downcomer 120 at a pressure greater than the pressure of the fluid stream in the contacting column through desorbent inlet line 121. Desorbent which acts in the capacity of carrier fluid, as aforesaid, is charged into the process flow through line 122 in amounts controlled by valve 123, the desorbent flowing from line 122 into internal passageway 125 through orifice 124 in the hollow axle of plug B of valve 105. The desorbent flows through inlet port 7 in housing A of valve 105 and thereafter into line 121 which directs the desorbent stream into the process flow, as aforesaid. The quantity of desorbent thus admitted into the process flow is sufficient to displace from the pores of the molecular sieve sorbent the n-hexane component previously sorbed from the feed stock in a prior cycle of operation and in order to effect such displacement, the n-butane desorbent must surround the spent sorbent occupying the spaces between the particles of spent sorbent, and must be present in an amount sufficient to cause a transfer of sorbed n-hexane from the spent sorbent into the surrounding n-butane. The amount of n-butane required to effect this result is generally from about 2 to 1 to about 30 to 1 molar ratios of desorbent to sorbed normal constituent of the feed stock present in the pores of the sorbent, preferably, in the example at hand, from about 5 to 1 to about 10 to 1 moles of n-butane per mole of sorbed n-hexane. In the case of other feed stocks and for other systems of separation, utilizing other sorbents, feed stocks and displacing agents, the molar ratio of the compound which effects the displacement to the compound to be displaced must be in the above order of magnitude.

The mixture of desorbent (n-butane) and displaced feed stock normal paraffin (n-hexane) which is formed as a result of the displacement of n-hexane from the spent sorbent by n-butane and occupancy of the sorbent by the n-butane, flows from zone 7' into contacting zones 8' and 9' by virtue of the positive pressure head between any given zone and a zone upstream relative thereto, through the interconnecting lines (downcomers) between the succeeding zones in series, ultimately flowing into downcomer 126 having outlet conduit 127 connected therewith. The outlet provided by conduit 127 for the mixture of n-butane desorbent and released n-hexane sorbate is the first fluid outlet from the series of beds following the raffinate outlet conduit 115 from which the fluid mixture comprising the desorbent and displaced n-hexane can be withdrawn, all other escape outlets through the valve being blocked by the solid portions of plug B of valve 105. The fluid stream leaving bed 9' of the contacting column 101 flows through outlet port 10 in housing A of valve 105 by virtue of the pressure differential between the fluid in column 101 and the fluid in outlet port 10, the fluid consequently flowing through port 10 into internal passageway 128 of valve plug B, thereafter flowing through orifice 129 in the hollow stem 110 of valve 105, and from passageway 128 through conduit 130 and valve 131 into additional processing equipment, not illustrated, for further purification or use of the resulting mixture, if desired. Such additional equipment may comprise distillation means, for example, to separate an enriched n-butane stream (which may be recycled) from a separate fraction of n-hexane sorbate. In some instances the desired end product of the present separation process is the sorbate component of the feed stock, whereas in other instances the object of the separation is to rid the feed stock of its normal constituents, and thus, the raffinate stream is desired as ultimate product.

In order to provide a residual stream for continuous circulation in the process equipment, only a portion of the total stream arriving at the outlet downcomer of contacting zone 9' (the proportion thus remaining being determined by valve 131) is withdrawn from downcomer 126 for discharge from the process flow through line 127 and eventually through conduit 128 and 130, the residue of mixed n-butane and n-hexane sorbate continuing its flow into contacting zone 10' and succeeding beds of fixed sorbent which effect a further rectification of the components of the mixture. The series of beds beyond the point of sorbate withdrawal (through downcomer 126) and wherein the iso-hexamers are washed out of the beds by the mixed n-hexane and n-butane in contacting zones 10', 11' . . . etc. is referred to herein as a "secondary rectification" stage of the process. At some further downstream point in the fixed bed of sorbent, the fluid stream consists of n-butane desorbent which acts in the capacity of carrier fluid in this section of contacting column 101, n-hexane and the iso-hexamer which have been displaced from the pores of the sorbent and pushed from the voids between particles of sorbent in zones 10', 11' . . . etc. When the most downstream bed in the series, such as bed 12' in the present example and at the point of time herein under consideration has been passed, the residual fluid stream comprising the above indicated three components is removed from zone 12' through downcomer 132 and in order to continue its cyclic, continuous flow downstream, into the inlet of contacting zone 1', it must be given an incremental increase in pressure to thereby provide a pressure differential between the inlet to the next downstream bed of sorbent and the outlet of the last upstream bed of sorbent. For this purpose, the fluid stream is withdrawn from downcomer 132 of contacting zone 12' and pumped to a higher pressure level by means of compressor 133 and discharged at said higher pressure into line 134 containing valve 135 which controls the flow of the continuously circulating fluid stream into the top of contacting zone 1' to repeat its cyclic flow in the manner hereinbefore described.

It will be apparent that each of the operations hereinabove described occur substantially simultaneously as plug B of valve 105 is continuously rotated in a counterclockwise direction and that at any given instant of time thereafter, each bed becomes progressively a more downstream bed with respect to the fluid stream continuously flowing upstream with respect thereto. Thus, if at any given instant, bed or contacting zone 1' is the point which first contacts fresh feed introduced into the process, at any given point of time thereafter, following a sufficient interval to permit the plug in valve 105 to complete $\frac{1}{12}$ of its rotation, zone 2' becomes the point of first contact with the feed stock and zone 1' is the last bed in the series of beds comprising the secondary rectification section of column 101. Thereafter, zones 2' through 12' become, successively, the beds of first contact. It will be noted that as the feed inlet continuously shifts, the raffinate outlet, desorbent inlet and sorbate outlet also shift in the same aliquot portion of the total cycle and as these points shift, the composition of the fluid stream at different points and composition of the sorbent beds also change, the iso-hexane component occupying the voids between sorbent particles only in those beds on either side of the raffinate outlet, generally only one, two or three beds beyond the raffinate outlet. Similarly, n-hexane is present in the pores of the solid sorbent occupying beds relatively upstream from the raffinate outlet so that the fluid stream reaching the bed which is the raffinate outlet in the continuously shifting point of raffinate withdrawal is essentially pure raffinate (isohexane) component in admixture with n-butane desorbent and the fluid stream reaching the bed which is the sorbate outlet (also a continuously shifting point of withdrawal) is essentially pure sorbate (n-hexane) in admixture with n-butane desorbent. These streams are contaminated only to the slight extent resulting from the residual fluid stream remaining in the lines leading from the contacting column to the valve port of a previous cycle of operation.

The flow rate of fluid in column 101 is adjusted to provide the maximum charging rate consistent with the maintenance of fixed bed conditions, which is dependent upon whether gas phase or liquid phase contacting is utilized and also upon the size of the particles of sorbent and the degree of packing the sorbent in the confines of the bed of sorbent. The latter may vary in size from finely divided powders (particles up to 100 mesh size, preferably not smaller than about 40 mesh size) to relatively large, granular particles, preferably not larger than about 2 mesh size. When utilizing gaseous feed stocks and displacing agents, the charging rate is below the rate at which fluidization of the sorbent particles occurs (for example, when the contacting zones are not completely filled with solid sorbent) at a rate preferably not in excess of about 3 volumes of feed per volume of sorbent per minute, more desirably at a rate of from about 0.1 to 1 to about 1.5 to 1 volumes of feed per volume of sorbent per minute. When utilizing liquid phase contacting conditions, the charging rate of feed stock is desirably not greater than about 1.5 volumes of feed per volume of sorbent per minute when utilizing relatively large granular particles of sorbent and more desirably from about 0.01 to 1 to about 1.0 volume of feed per volume of sorbent per minute. These rates are, of course, dependent upon the size of the sorbent particles, the depth and width of the sorbent beds and other factors which are dependent upon the design of the apparatus and the process conditions. When the sorbent completely fills the beds, the limiting rate of flow of fluid through each bed is set by the free or "void" space between particles of sorbent, the space thus provided establishing a maximum accommodation flow for any given pressure differential, but which may be increased if a greater pressure differential is tolerable. The finer the particles of sorbent, the greater the pressure drop through each bed, the ultimate permissible flow rate being fixed as that rate which does not give rise to a pressure drop through all of the beds greater than the discharge pressure delivered by the circulating fluid pump.

In order to recover the desorbent from the mixed desorbent-raffinate and desorbent-sorbate streams withdrawn from the process, it is generally preferable that the boiling point of the desorbent differs sufficiently from the feed stock components to be readily separable therefrom by suitable fractionation means, such as simple distillation.

The process of this invention is operated at conditions of temperature, pressure, and under other process conditions which depend upon the particular feed stock involved, the particular sorbent utilized in the contacting zones and the required purity of product. In general, in liquid phase operations the pressure is substantially less than when employing gaseous phase conditions, the latter being dependent upon generally the molecular weight of the feed stock components. Thus, in a process for separating normal and isoparaffins or normal and cyclic compounds, the process will more desirably be effected in gaseous phase when the components of the feed stock contain fewer than about 5 carbon atoms per molecule and preferably in liquid phase for compounds of high molecular weight; otherwise, the pressure required to maintain the fluid in liquid phase may become excessive. For gaseous phase operation a suitable process temperature may vary from about 60° to about 300° C. and pressures may be within the range of from substantially atmospheric to 10 atmospheres or more. Typical liquid phase conditions are, for example, temperatures of from 0° C. to 200° C. and at pressures of from atmospheric to 30 atmospheres, or higher, depending upon the charge stock. In the process for de-ionizing water, using a zeolite-type of sorbent, the operation is generally effected in liquid phase and at temperatures substantially below the boiling point of water. In another typical instance, for example, in the separation of aromatic hydrocarbons from aliphatic paraffins containing at least 6 carbon atoms per molecule, utilizing a silica gel adsorbent, the operation may be effected in either gas or liquid phase conditions, at temperatures of from about 30° to about 250° C. and at pressures from substantially atmospheric to 10 atmospheres or more.

This invention is further illustrated with respect to several of its specific embodiments concerning process conditions, solid sorbent, illustrative feed stock and illustrative desorbents in the following examples which, however, are not intended to limit the scope of the invention to the specific embodiments illustrated therein.

*Example 1*

The process of this invention is typically illustrated in the following run which comprises a method for separating a mixture of normal and cyclohexanes into a stream of relatively pure n-hexane and a secondary product of substantially pure cyclohexane. In the following run, an apparatus comprising a series of 12 vertically positioned, interconnected fixed beds is provided, each bed consisting of a section of 2-inch (2.067 inches inside diameter) pipe approximately 4-ft. in length containing a fixed bed of molecular sieve sorbent 3.6-ft. in length, the inlet at the top and the outlet at the bottom of each of the beds being a $\frac{1}{16}$-inch nipple tapped into a 2-inch pipe cap fitted on each end of the 2-inch pipe, the bed of sorbent being suspended above the outlet by an internal screen across the pipe. The bottom of each bed is connected by a $\frac{1}{16}$-inch pipe to the top of the next adjacent bed, the line connecting the bottom of the twelfth bed to the top of the first bed containing a liquid pump which delivers liquid to the top of bed No. 1 at a pressure differential between the 12th and 1st beds of about 45 lbs./in.$^2$. The molecular sieve sorbent is composed of particles of calcium alumino-silicate (Linde Air Products Co., 5 A. sieves) of random sizes within a range of sizes in which 95% will pass a 4 mesh screen and at least 98% by weight will be retained on a screen of 50 mesh size. The molecular sieve sorbent is packed into each pipe to provide a bed containing 46.5 cubic inches per bed.

Four feed and withdrawal lines of 1-inch pipe (one feed stock feed line, one raffinate withdrawal line, one desorbent feed line and one sorbate withdrawal line) are provided for the process, the four 1-inch lines being manifolds for distribution of the inlet and outlet streams to and from each of the fixed beds of sorbent. The inlet line into each bed of sorbent is connected in parallel with four, separately valved $\frac{1}{16}$-inch lines, each one of the latter four lines being connected to the four manifolds. Thus, each bed may be fed with separate streams of desorbent or feed stock or may have withdrawn therefrom separate streams of raffinate and sorbate. The valves on each of the four lines connecting each bed with each manifold are motor operated by switches activated with a program timing device which opens the feed line to one bed at a time while maintaining the valves to the remaining 11 beds in closed positions, simultaneously maintaining in open position the valve in the line connecting one bed (downstream relative to the bed receiving feed stock) to the raffinate withdrawal manifold and the valves to all other beds from the raffinate line closed, simultaneously maintaining in open position the valve in the line connecting one bed (downstream relative to the bed from which raffinate is withdrawn) to the desorbent inlet line while maintaining all other valves between the desorbent manifold and the remaining beds closed, and simultaneously maintaining in open position the valve connecting one bed (downstream relative to the bed into which desorbent is charged) to the sorbate withdrawal manifold while maintaining in closed position the valves between all other beds and the sorbate withdrawal manifold. The process is started by charging a mixture of n-hexane and cyclohexane (40 weight percent n-hexane, 60 weight percent cyclohexane) at a temperature of 40° C. and at a pressure of 110 lbs./in.$^2$ into bed No. 1 at a flow rate of 1.0 gallon/hr. for a period of 30 minutes, simultaneously opening the raffinate (cyclohexane) valve between beds Nos. 3 and 4 and maintaining it in open position for 30 minutes, simultaneously opening the inlet valve for n-butane desorbent into bed No. 7 (i.e., between beds 6 and 7) and charging n-butane at 40° C. and at approximately 100 lbs./in.$^2$ pressure at a rate of 1.0 gallon of liquid n-butane per hour into the inlet line to said bed, and simultaneously opening the sorbate (n-hexane) outlet valve between beds Nos. 9 and 10. The valves between all other beds and said manifolds are closed but the lines between adjacent beds are open to the free flow of fluid therebetween. After one-half hour of such operation, the valve operating mechanism which can be set to program a series of operations on one-half hour or shorter or longer periods closes the valve controlling the feed inlet line between the feed stock manifold and bed No. 1, simultaneously opens the valve in the feed inlet line between the feed stock manifold and the downcomer from bed No. 1 to bed No. 2, simultaneously closes the raffinate outlet valve in the line connecting the downcomer from bed No. 3 to the raffinate manifold while simultaneously opening the valve in the line connecting the downcomer from bed No. 4 with the raffinate manifold, simultaneously closes the valve in the line connecting the downcomer from bed No. 6 (inlet to bed No. 7) to the desorbent inlet manifold while simultaneously opening the valve in the line connecting the downcomer from bed No. 7 (inlet to bed No. 8), and simultaneously closes valve in the line connecting the downcomer from bed No. 9 (inlet to bed No. 10) while opening the valve in the line connecting the downcomer from bed No. 10 (inlet to bed No. 11) to thereby change the point of withdrawing sorbate from bed No. 10 to bed No. 11. The above beds are retained on stream for one-half hour, followed by simultaneous shifts in the inlet and outlet streams to the next downstream beds.

The valves controlling the inlet stream (feed stock and desorbent) are set to operate in a fully open position; the valve in the feed and withdrawal lines from each bed are set to operate at equal volumetric flow rates adjusted on a volumetric basis to compensate for differences in pressure at the several points of inlet and outlet throughout the column. During the startup period of operation (wherein feed stock is charged into bed No. 1, and desorbent is charged into bed No. 7) all valves remain in their initial setting for a total period of one hour, in order to build up the required circulating fluid inventory in the apparatus. The raffinate stream removed from bed No. 3 after one-half hour of operation at a rate of 10 gallons/hr. is composed of 60% by weight of cyclohexane and 40% by weight of n-butane. The sorbate stream withdrawn from bed No. 9 at the rate of 1.0 gallon/hr. is composed of 40% by weight of n-hexane and 60% by weight of n-butane. The stream recycled from the bottom of bed No. 12 to the top of bed No. 1 at a rate of 1.0 gallon/hr. is composed of 60% by weight of n-butane and 40% of weight of n-hexane, the latter representing inventory provided for the system by operating the initial stage of the process for double the normal one-half hour cycle.

The sorbate and raffinate outlet streams are each individually fractionated to separate substantially pure n-hexane and cyclohexane product streams and a n-butane overhead which may be directly recycled to the process. The above separation is operated on a continuous basis for 35 days without obvious depreciation in the activity of the molecular sieve sorbent.

*Example II*

The method of this invention is further illustrated in the following run by its application to a process for de-ionizing a tap water stream of its hardness-producing metallic ions (water softening) to thereby produce a constant supply of substantially completely de-ionized water as the principal product of the process.

The water softening device used in the following run comprises a tank containing 4 separate beds of de-ionizing resin (Dowex-50, a sulfonated polystyrene in particle form averaging 10 mesh size), each bed having a downcomer pipe connecting the bed to a subadjacent bed in the series of 4 beds. The downcomer outlet of the lowermost bed is connected by a pipe with the incoming line of the uppermost bed in the series. Each downcomer pipe (which also serves as the inlet to the bed subadjacent thereto), including the return pipe from the bottom of the lowermost bed to the top of the uppermost bed, contains a valve and each downcomer pipe is connected above the valve by two valved lines to two outlet manifold lines, one manifold carrying away softened water and the other manifold carrying away brackish water formed in the resin regeneration portion of the process cycle, as hereinafter described. Each downcomer pipe also contains two valved lines connected into the pipe below the valve therein, these lines being connected with supply manifolds, one pipe connecting with a fresh, hard water feed supply manifold while the other valved line is connected to a concentrated sodium chloride solution feed supply manifold. The portion of the downcomer above the downcomer valve thus directs the flow of liquid out of the column, from a bed superadjacent to the valve, while the portion of the downcomer below the valve therein directs the flow of liquid into a bed subadjacent to the downcomer valve.

In each stage of operation (¼ of the total time required to consume the water-softening capacity of the entire apparatus), one bed only of the four total beds undergoes regeneration for a period of 3 hours, while the remaining beds are continuously in service supplying softened water over a 10-day period before the feed inlet point is changed to the next adjacent downstream bed.

The cycle of operation is described more clearly by reference to a typical actual flow in the above apparatus. Hard water containing 110 p.p.m. of hardness is fed at a rate of 30 gallons/hr. into the top of the first bed of the above series of four adjacent, interconnected beds, each containing 150 lbs. of the Dowex-50 resin. Simultaneously, in accordance with the programming device which switches the electrically operated valves, a stream of concentrated aqueous sodium chloride (containing approximately 24.5% by weight of the salt in solution) is charged into bed No. 4 in the series of four beds, until said bed No. 4 is completely filled with the salt solution, the valve in the downcomer from bed No. 4 being closed while the valve in the line connecting the downcomer from bed No. 4 to the brackish water outlet line is open for 10 minutes (to permit flushing of bed No. 4 with salt solution) and then closed for 3 hours. The valve in the downcomer from bed No. 3 and the valve in the line connecting the downcomer from bed No. 3 to the soft water outlet line is open. The salt solution remains in contact with the resin in bed No. 4 for the above 3 hour period and thereafter the valve in the line connecting the downcomer from bed No. 4 to the brackish water outlet manifold is opened. Simultaneously, the valve in the downcomer from bed No. 3 is partially opened, thereby permitting soft water from bed No. 3 to flush at a slow rate the brackish water from bed No. 4 (flushing being completed when ion-free water in the downcomer from bed No. 4 appears, after approximately 2 minutes). The valve in the line connecting the downcomer from bed No. 4 to the brackish water outlet is then closed, the valve in the line connecting the downcomer from bed No. 3 to the soft water outlet manifold is closed, and the valve in the line connecting the downcomer from bed No. 4 with the soft water outlet line is opened. The water product thereby formed is essentially ion-free and remains substantially at zero hardness for the entire 10 day period involved in the programmed cycle, constantly withdrawing ion-free water product at the rate of 30 gallons/hr.

After 10 days on stream, the valve in the line charging fresh, hard water feed into bed No. 1 (the downcomer of bed No. 4) is closed, the valve in the line connecting the downcomer from bed No. 1 with the fresh water feed manifold is closed, the valve in the line connecting the downcomer from bed No. 1 with brackish water outlet is opened, the valve in the downcomer from bed No. 1 is closed, the valve in the line connecting the inlet line to bed No. 1 (downcomer from bed No. 4) with the salt water inlet manifold is opened for 10 minutes, allowing concentrated salt solution to flush through bed No. 1 until the spaces between resin particles are completely replaced with salt solution, the resulting brackish water effluent being removed from bed No. 1 by flowing into the brackish water outlet manifold. The valve in the line connecting the latter manifold with the downcomer from bed No. 1 is thereafter closed for 3 hours. The valve in salt solution inlet line to bed No. 1 is thereafter closed and for the following three hours, the Dowex-50 resin in bed No. 1 undergoes regeneration. Thereafter, the inlet to the top of bed No. 1 from the downcomer of bed No. 4 is opened by partially opening the valve in the downcomer from bed No. 4 and the valve in the line connecting the downcomer from bed No. 1 to the brackish water outlet is opened. Soft water effluent from bed No. 4 thereby flows into bed No. 1, flushing the residual brackish water therein into the brackish water outlet manifold until the effluent stream is ion-free (about 10 minutes). The latter valve in the line connecting the downcomer from bed No. 1 with the brackish water outlet manifold is then closed and the valve in the line connecting the downcomer from bed No. 1 with soft water product outlet manifold opened, the stream of softened water flowing through bed No. 1 thereafter being withdrawn as product until the expiration of the next succeeding period of 10 days. Thereafter bed No. 2 is regenerated by essentially the same procedure as indicated above, following thereafter by bed No. 3, etc.

It will be noted that at no time during operation of the above procedure, including the period required for regeneration is there an interruption in the constant flow of soft water from the unit, the quantity of soft water product being reduced slightly for, at most, 30 to 60 seconds, by the quantity required to flush brackish water from the regenerated resin, a quantity generally not greater than the volume of the bed. It will also be noted that the ion level in the softened water stream is substantially constant at a very low level and does not undergo wide fluctuations in the ion-concentration level as does the product of a periodically regenerated system where the hardness ion concentration attains relatively high levels at periods immediately prior to regeneration.

We claim as our invention:

1. A continuous process for separating the components of a mixture of fluid compounds, at least one of which is selectively sorbed by contact with a solid sorbent and at least one other component is relatively less sorbed by the sorbent which is capable of having its sorbency restored by displacing selectively sorbed components therefrom, said process comprising the steps: introducing feed stock containing said mixture of compounds into one zone of a fixed bed of said solid sorbent containing at least 4 serially interconnected zones having fluid flow connecting means between adjacent zones and between the outlet of the last zone and the inlet of the first zone in the series, to thereby provide cyclic, fluid flow in said process, introducing a desorbent capable of displacing the selectively sorbed component from said sorbent into another zone of the fixed bed of sorbent which is downstream relative to the zone into which said feed stock is charged, substantially simultaneously withdrawing relatively less sorbed component from an intermediate zone of said fixed bed, between the zone into which said feed stock is charged and the zone into which said desorbent is charged, substantially simultaneously withdrawing a mixture of selectively sorbed component and desorbent from a zone which is downstream with respect to the zone into which said desorbent is charged, maintaining a continuously circulating stream of fluid flowing through said series of interconnected zones, and periodically advancing downstream the point of charging said feed stock, while simultaneously and equally advancing the point of charging desorbent and withdrawing sorbed and relatively less sorbed components.

2. The process of claim 1 further characterized in that a continuously circulating stream comprising desorbent is maintained in each of said beds.

3. The process of claim 1 further characterized in that said sorbent is a dehydrated metal aluminosilicate hydrate containing pores which permit the sorption of a straight chain compound containing at least 4 carbon atoms and which rejects compounds containing at least 4 carbon atoms having a branched chain or cyclic structure.

4. The process of claim 3 further characterized in that said mixture of individual compounds comprises a normal aliphatic hydrocarbon containing at least 4 carbon atoms as the selectively sorbed component and a hydrocarbon selected from the group consisting of branched chain and cyclic hydrocarbons containing at least 4 carbon atoms as the other component relatively less sorbed by the sorbent.

5. The process of claim 3 further characterized in that said sorbent is a dehydrated calcium aluminum silicate hydrate containing pores of 5 Angstrom units cross-sectional diameter.

6. The process of claim 4 further characterized in that said desorbent is a straight chain aliphatic hydrocarbon having fewer carbon atoms than said normal aliphatic hydrocarbon component of said mixture.

7. The process of claim 4 further characterized in that said normal aliphatic hydrocarbon is a paraffin.

8. The process of claim 4 further characterized in that said normal aliphatic hydrocarbon is a paraffin and said other component is a paraffinic isomer of said normal paraffin.

9. The process of claim 4 further characterized in that said normal aliphatic compound is a paraffinic hydrocarbon and said other component is a cyclic hydrocarbon containing the same number of carbon atoms as the normal paraffin.

10. The process of claim 1 further characterized in that said mixture is maintained in each of said fixed beds in substantially liquid phase.

11. The process of claim 10 further characterized in that said desorbent is maintained in said beds in substantially liquid phase.

12. The process of claim 1 further characterized in that said sorbent is a solid capable of de-ionizing an aqueous solution.

13. The process of claim 12 further characterized in that sorbent is a solid capable of combining with the metallic ions in hard water and said desorbent is an aqueous solution of a reagent capable of restoring the sorbent to its de-ionizing capacity.

14. The process of claim 1 further characterized in that said desorbent is a compound which differs in boiling point by at least 10° C. from the boiling point of the compounds present in said mixture.

15. The process of claim 1 further characterized in that each of said zones comprises at least one fixed bed of said solid sorbent separated from a bed adjacent thereto by a fluid conduit of restricted cross-section.

16. The process of claim 1 further characterized in that said zones are contained within a single, fixed bed of solid sorbent, the boundaries of said zones being defined by the fluid inlets and outlets into and from said bed.

References Cited in the file of this patent

UNITED STATES PATENTS

| | | |
|---|---|---|
| 2,599,545 | Egan et al. | June 10, 1952 |
| 2,617,765 | Swarr | Nov. 11, 1952 |
| 2,797,190 | Scott et al. | June 25, 1957 |
| 2,799,362 | Miller | July 16, 1957 |
| 2,799,363 | Miller | July 16, 1957 |
| 2,799,364 | Miller | July 16, 1957 |
| 2,818,137 | Richmond et al. | Dec. 31, 1957 |

UNITED STATES PATENT OFFICE
CERTIFICATE OF CORRECTION

Patent No. 2,985,589

May 23, 1961

Donald B. Broughton et al.

It is hereby certified that error appears in the above numbered patent requiring correction and that the said Letters Patent should read as corrected below.

Column 7, line 21, for "primary rectifying" read -- desorption --.

Signed and sealed this 29th day of October 1963.

(SEAL)
Attest:
ERNEST W. SWIDER
Attesting Officer

EDWIN L. REYNOLDS
Acting Commissioner of Patents